United States Patent [19]
Habiger

[11] 3,952,514
[45] Apr. 27, 1976

[54] UNDERSPEED ACTUATOR FOR HYDROSTATIC TRANSMISSION

[75] Inventor: Cyril W. Habiger, Joliet, Ill.
[73] Assignee: Caterpillar Tractor Co., Peoria, Ill.
[22] Filed: Feb. 20, 1975
[21] Appl. No.: 551,474

[52] U.S. Cl.................................. 60/445; 60/447; 60/465
[51] Int. Cl.² ........................................ F16H 39/46
[58] Field of Search ............. 60/399, 445, 447, 449, 60/462, 465, 488

[56] References Cited
UNITED STATES PATENTS

| | | | |
|---|---|---|---|
| 3,054,263 | 9/1962 | Budzich et al. | 60/447 |
| 3,371,479 | 3/1968 | Yapp et al. | 60/445 X |
| 3,477,225 | 11/1969 | Cryder et al. | 60/433 |
| 3,528,243 | 9/1970 | Cryder et al. | 60/399 |
| 3,727,628 | 4/1973 | Habiger et al. | 60/445 X |

Primary Examiner—Edgar W. Geoghegan
Attorney, Agent, or Firm—Phillips, Moore, Weissenberger, Lempio & Strabala

[57] ABSTRACT

A hydrostatic unit of the type contemplated by the present invention includes one or more pump and motor combinations interconnected by means of a conventional closed loop. Controls for the hydrostatic unit include a speed control and vent valve assembly together with a venturi manifold which function together to normally establish a selected pressure differential in a pair of supply conduits for determining instant operating conditions for the transmission. In order to automatically regulate displacement of each pump unit in response to engine or prime mover speed as determined by load conditions, an underspeed actuator valve unit includes a piston which is hydraulically responsive to the differential pressure in order to adjust the effective moment arm for a lever which controls displacement of the pump unit. Preferably, the piston is acted upon by a variable rate spring means for improved stability with the speed control and vent valve assembly being manually operable into an override mode for overcoming the effect of the differential pressure upon the underspeed actuator valve and terminating or reducing torque transmission.

22 Claims, 9 Drawing Figures

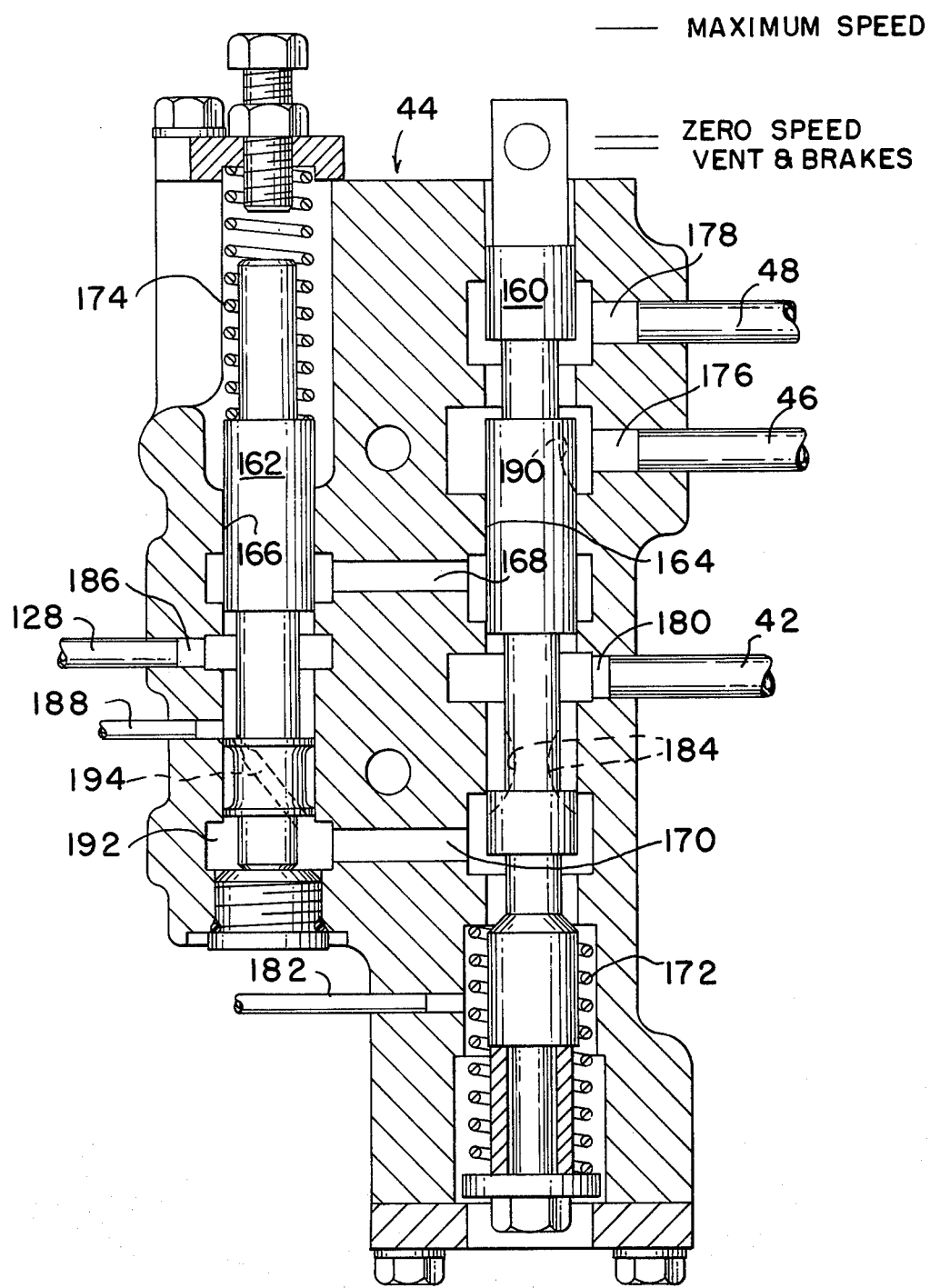

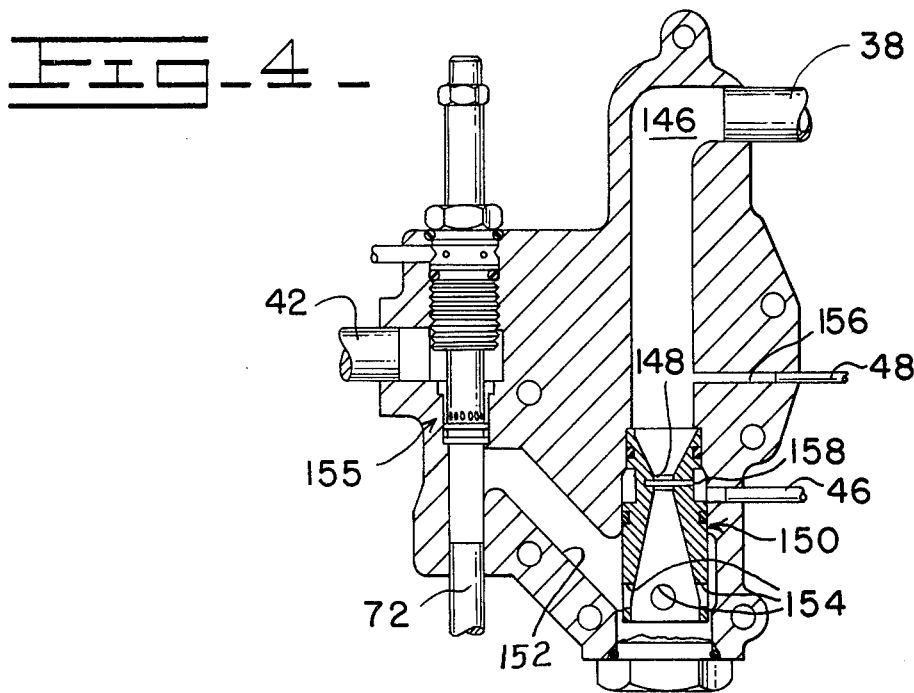
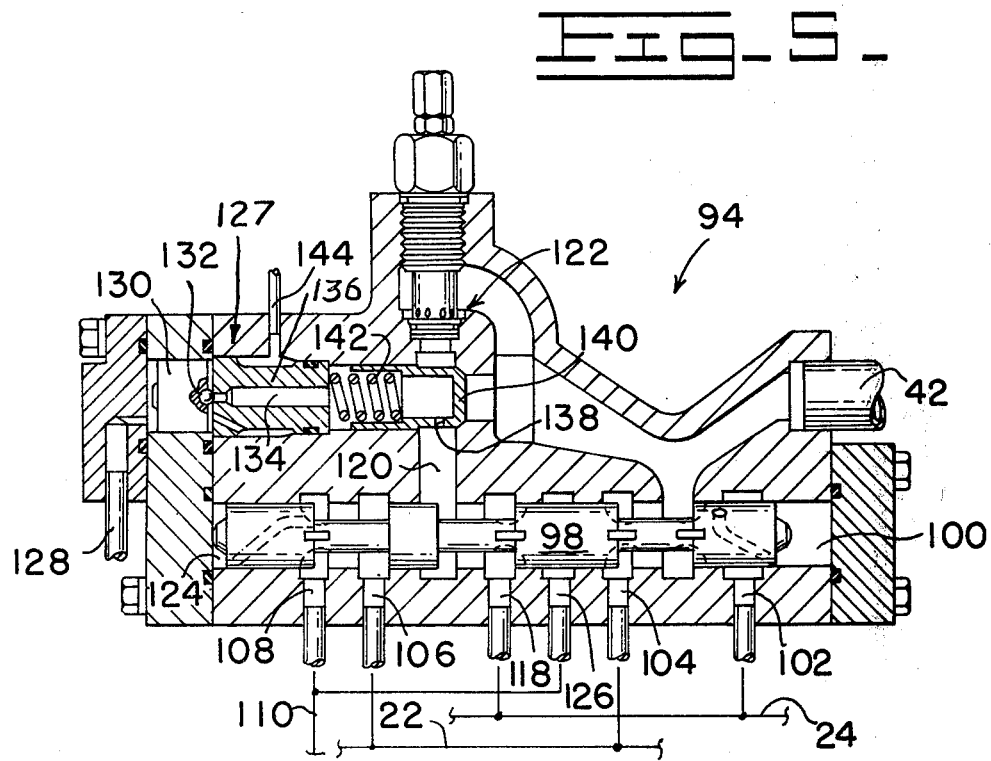

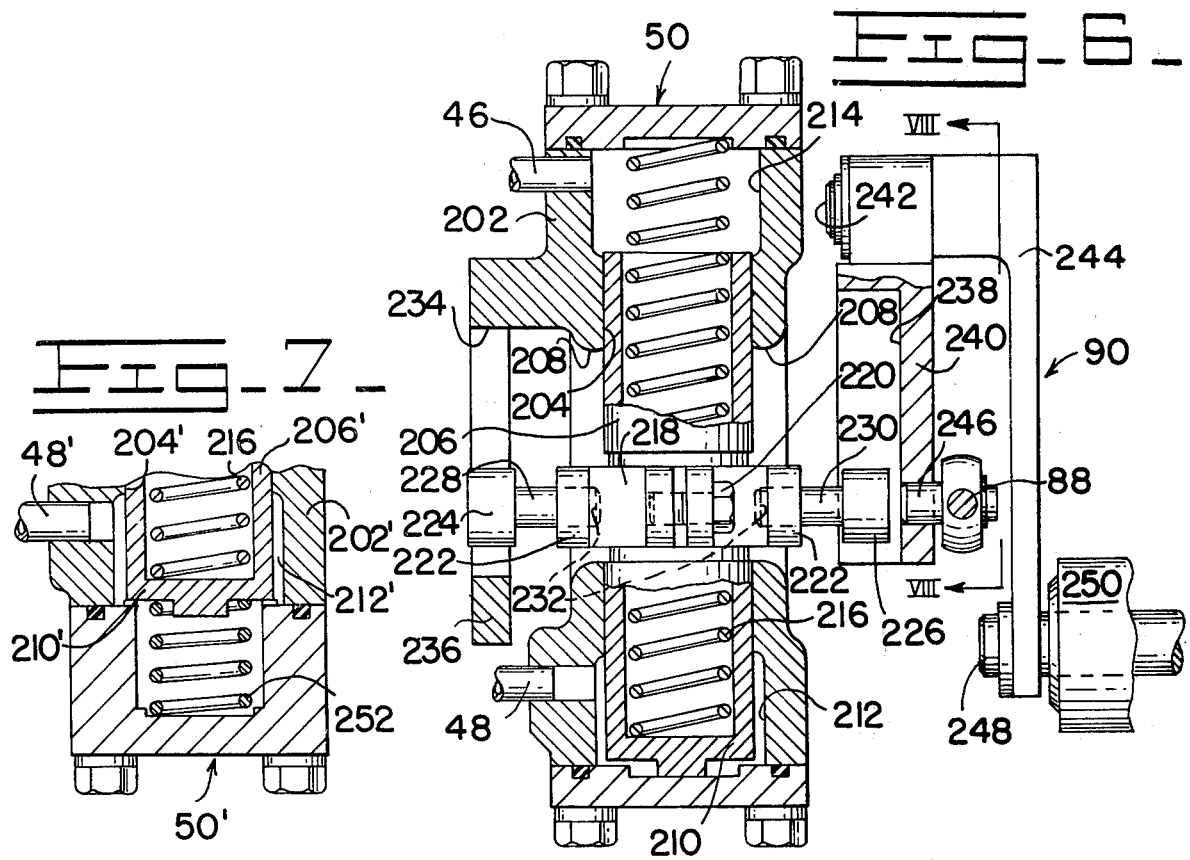
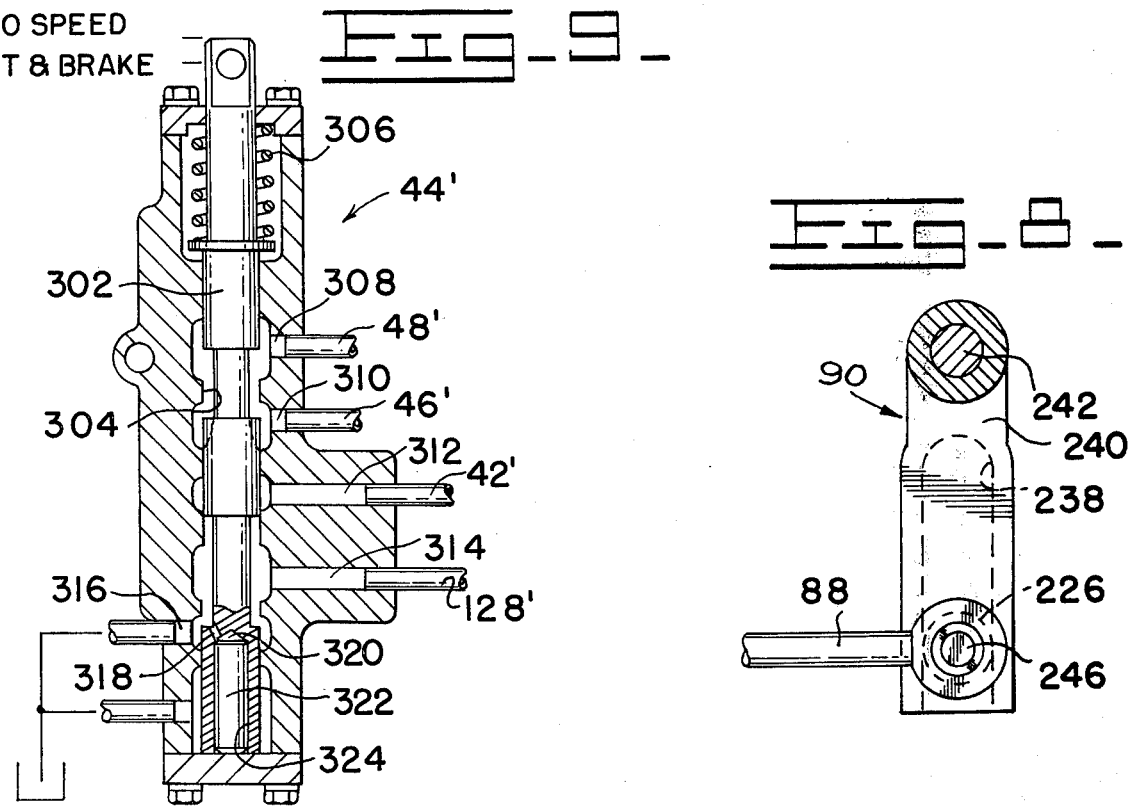

UNDERSPEED ACTUATOR FOR HYDROSTATIC TRANSMISSION

BACKGROUND OF THE INVENTION

The present invention relates to an underspeed actuator unit which is responsive to operating speed of a prime mover or engine in order to automatically adjust a variable drive coupling in a transmission driven by the prime mover. In particular, the transmission is contemplated as being of a hydrostactic type including one or more pump units with the underspeed actuator being operable to adjust displacement in the pump or pumps.

Hydrostatic transmissions adapted for track-type vehicles commonly include parallel pump units each having variable displacement in order to permit operator control over vehicle speed and direction by appropriately varying displacement of one or both pumps. The present invention is particularly described below in connection with a hydrostatic transmission of this type. However, it will be apparent from the following description that the present invention is also applicable to more conventional hydrostatic transmissions having a single pump unit or multiple pump units whose displacement is always simultaneously varied.

In most hydrostatic transmissions, it is desirable to reduce the load placed upon the prime mover by the transmission when operating speed of the prime mover falls below a selected range because of an external load, such as when a vehicle including the prime mover and transmission is operating uphill or otherwise encounters an increased load.

The use of underspeed regulator or actuator valves is known in connection with hydrostatic transmissions for overcoming this problem may be seen by reference to U.S. Pat. No. 3,477,225 and U.S. Pat. No. 3,727,628, both of which are assigned to the assignee of the present invention. Such underspeed units have been reasonably successful in achieving their objectives while tending to be relatively complex, thus increasing initial and operating costs for the hydrostatic units. In particular, such prior art underspeed valves have commonly been connected to servo valves for regulating variable displacement of the hydrostatic pump units through hydraulic actuator devices. This particular combination has been found to be relatively costly and complex at least in comparison to the present invention.

SUMMARY OF THE INVENTION

Accordingly, it is an object of the present invention to provide a simple underspeed actuator unit for adjusting the variable capacity of a transmission relative to operating speed of a prime mover coupled with the transmission input.

It is a more particular object of the invention to provide an underspeed actuator unit in conjuction with a hydrostatic transmission, the underspeed actuator unit having an adjustable moment arm for effectively varying displacement of a pump unit within the hydrostatic transmission in response to operating speed of the prime mover.

It is a further object of the invention to provide such an underspeed actuator unit for a hydrostatic transmission wherein a piston for establishing the variable moment arm is acted upon by a variable rate spring means in order to achieve improved stability.

It is another more particular object of the invention to employ additional hydraulic means for further stabilizing operation of the underspeed regulator unit.

It is yet another object of the invention to provide an underspeed actuator unit responsive to a differential pressure produced by a proportional pump, a venturi manifold assembly and a speed control and vent valve assembly, the speed control and vent valve assembly being manually operable to override the underspeed actuator unit.

Additional objects and advantages of the invention are made apparent in the following description having reference to the accompanying drawings.

BRIEF DESCRIPTION OF THE DRAWINGS

FIG. 3 is an enlarged view, in longitudinal section, of a speed control and vent valve unit employed within the hydrostatic control system of FIGS. 1 and 2.

FIG. 4 is a more detailed and enlarged view, in longitudinal section, of a venturi manifold unit employed within the hydrostatic transmission control system of FIGS. 1 and 2.

FIG. 5 is an enlarged, sectioned view of one of a pair of replenishing and relief valve employed within the hydrostatic transmission control system of FIGS. 1 and 2.

FIG. 6 is a detailed view, with parts in section, of an underspeed actuator unit particularly embodying the present invention and included within the hydrostatic control system of FIGS. 1 and 2.

FIG. 7 is a fragmentary view of a portion of an underspeed actuator unit illustrating an alternate mode of construction according to the present invention.

FIG. 8 is a view taken along section line VIII—VIII of FIG. 6.

FIG. 9 is another enlarged, sectioned view of a speed override and vent valve unit employable within the hydrostatic transmission control system of FIGS. 1 and 2 in place of the speed control and vent valve unit of FIG. 3.

DESCRIPTION OF THE PREFERRED EMBODIMENTS

As indicated above, the present invention relates particularly to an underspeed actuator within a control system for a variable capacity transmission, the underspeed actuator being responsive to operating speed of a prime mover coupled with the transmission input. The invention is particularly directed toward a hydrostatic transmission and control circuit illustrated in composite by FIGS. 1 and 2.

THE CONTROL CIRCUIT OF FIGS. 1 AND 2

Figure 1:
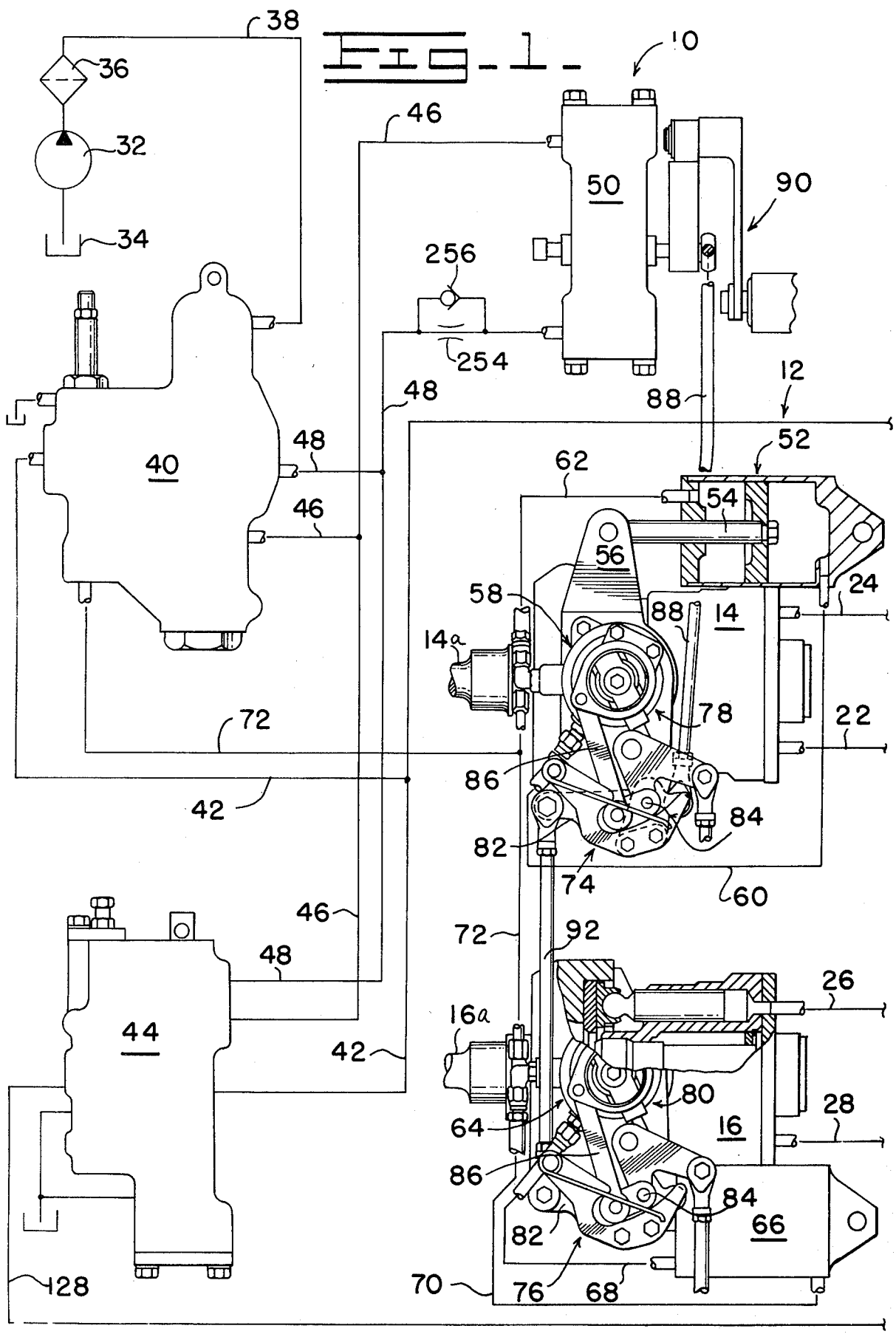
FIGS. 1 and 2 are both schematic representations, with parts illustrated in section, to provide a composite view of a control system for a pair of variable displacement pump units within a hydrostatic transmission.
Figure 2:
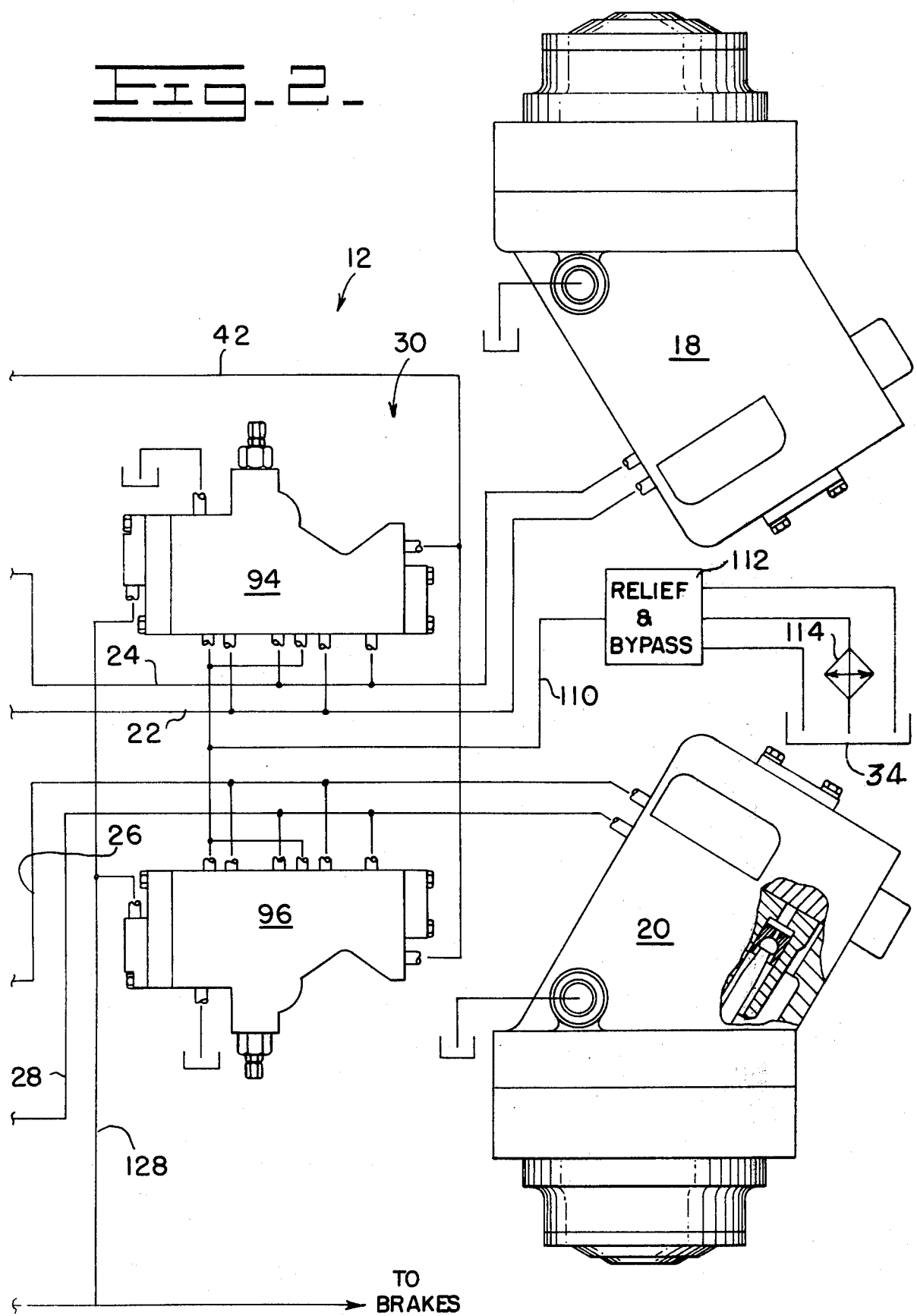

Referring now to FIGS. 1 and 2, a hydrostatic control circuit is generally indicated at 10 for association with a hydrostatic transmission 12 including two varible displacement, over-center pump units 14 and 16 and two fixed displacement motor units 18 and 20. The first pump unit 14 is in communication with the motor unit 18 by means of a closed hydrostatic loop including conduits 22 and 24. The second pump unit 16 is similarly in communication with the motor unit 20 by means of a closed hydrostatic loop including two conduits 26 and 28.

A replenishing and relief valve assembly 30 is interconnected with both pairs of hydrostatic conduits 22, 24, and 26, 28. The replenishing and relief valve assembly 30 functions in a generally conventional fashion as described in greater detail below in order to replace hydraulic fluid lost from the pump and motor combinations due to leakage and to relieve hydraulic pressure developing within the pump units, the motor units and the interconnecting hydrostatic loops above a preselected level.

Each of the pump units 14 and 16 includes an input shaft 14a or 16a for coupling with a conventional prime mover or engine (not shown).

A fluid supply for both the hydrostatic control circuit 10 as well as the replenishing and relief valve assembly 30 is provided by a positive displacement discharging pump 32 conventionally driven by the prime mover for the transmission 12. The pump 32 draws hydraulic fluid from a reservoir or sump 34 and delivers fluid under pressure through a filter 36 into an inlet conduit 38 for a venturi manifold unit 40. The venturi manifold unit 40 supplies makeup fluid to the replenishing and relief valve assembly 30 through a branched conduit 42.

A speed control and vent valve 44 is also interconnected with the branched line 42 and further communicates with the venturi manifold 40 by means of a pair of branched conduits 46 and 48.

An underspeed actuator unit 50 is in communication with both the venturi manifold unit 40 and the speed control and vent valve assembly 44 by means of the branched lines 46 and 48. Construction and operational features for the underspeed actuator 50 as well as the venturi manifold 40 and speed control valve 44 are described in greater detail below.

The pump unit 14 includes a double-acting fluid actuator 52 having an extendable rod 54 coupled with a swash plate 56 for controlling fluid output from the pump through the conduits 22, 24.

The pump unit 14 includes a rotary servo valve 58 which is connected to the head end and rod end respectively of the actuator 52 by means of conduits 60 and 62. Similarly, a rotary servo valve 64 for the pump 16 is connected to the rod end and head end of another actuator 66 by conduits 68 and 70. Both rotary valves 58 and 64 are of a conventional type having a valve spool (not shown) which is rotatable therein for controlling fluid flow to the actuators 52 and 66. The spools may be rotated in either clockwise or counterclockwise fashion in order to extend or retract the respective actuators 52 and 66. This results in either clockwise or counterclockwise rotation of the swash plates to establish the direction of rotation for the respective motors 18 and 20. Actuating fluid for the servo valves 58 and 64 is supplied through a branched conduit 72 which is also in communication with the venturi manifold 40.

Each of the pumps 14 and 16 includes a control linkage arrangement 74 or 76 for positioning the valve spool of the respective servo valves 58 and 64 through separate null and gain adjuster mechanisms generally indicated at 78 and 80, respectively. Construction and operation of a control linkage of the type indicated at 74 or 76 is described in greater detail within a copending U.S. patent application entitled: CONTROL LINKAGE FOR HYDROSTATIC TRANSMISSIONS, filed on Dec. 9, 1974 as Ser. No. 530,924. Similarly, a null and gain adjuster mechanism of the type indicated at 78 or 80 is also more completely described within a copending patent application entitled: NULL AND GAIN ADJUSTMENT MECHANISM FOR HYDROSTATIC PUMPS AND MOTORS, filed on Dec. 9, 1974, as Ser. No. 530,926. Both of these inventions are assigned to the assignee of the present invention.

These elements are summarized below sufficiently to explain the present invention. Generally, each of the pumps 14 and 16 includes a control lever 82 which may be rotated in clockwise fashion (as seen in FIG. 1) about a pivot point 84 which causes a link 86 to rotate the respective null and gain adjuster mechanisms 78 and 80 in a clockwise direction along with the valve spool for each rotary servo valve 58 and 64. Counterclockwise rotation of the levers 82 similarly results in counterclockwise rotation of the valve spools. The lever 82 for the pump 14 is manually controlled by a link 88 which is pivotably connected at one end to the lever 82, the other end of the link 88 being pivotably connected to a manually operable lever arrangement 90 which is associated with the underspeed actuator 50. An additional link 92 is interconnected between the levers 82 for the pumps 14 and 16 so that the valve spools for both rotary servo valves 58 and 64 are operated in unison. The control linkage arrangement described immediately above is resiliently urged toward a neutral position shown in FIG. 1, for example, by means of a conventional centering spring mechanism (not shown).

THE REPLENISHING AND RELIEF VALVE ASSEMBLY

Although operation of the replenishing and relief valve assembly 30 is not an essential portion of the present invention, its construction and operation is briefly described below in order to permit a better understanding of the invention. The replenshing and relief valve assembly 30 generally corresponds to the disclosure of U.S. Pat. No. 3,528,243, having particular reference to FIG. 8 of that patent. The replenishing and relief assembly 30 includes a pair of valves indicated respectively at 94 and 96. The valve 96 is similar in construction and operation to valve 94 which is also illustrated in greater detail in FIG. 5.

Referring also to FIG. 5, the replenishing and relief valve 94 includes a valve spool 98 which is shifted in response to the relatively higher fluid pressure developed in either of the conduits 22 and 24. For example, when higher fluid pressure exists within the conduit 24, that fluid pressure enters a chamber 100 through an inlet port 102 in order to shift the valve spool 98 into the position illustrated in FIG. 5. With the spool 98 in that position, replenishing fluid from the supply line 42 is communicated to the conduit 22 across the spool 98 and through an outlet port 104. Thus, a positive pressure is established within the lower pressure conduit 22 in order to prevent pump cavitation while also adding cooled fluid to the closed hydrostatic loop between the pump and motor.

Excess fluid is removed from the conduit 22 through a port 106. With the spool 98 in the position illustrated in FIG. 5, the port 106 is in communication with another port 108 which communicates through a conduit 110 with a relief and by-pass valve 112, a heat exchanger or cooler 114 and the common sump 34, those elements being illustrated in FIG. 2.

At the same time, another port 118 within the valve communicates fluid from the conduit 24 across the spool 98 and through a passage 120 leading to relief valve 122. The relief valve 122 opens in response to fluid pressure from the conduit 24 above a preselected level. The relief valve communicating excess fluid from the conduit 24 back to the spool 98 and through the port 104 into the lower pressure conduit 22.

The valve 94 works in substantially the same fashion when higher fluid pressure is developed within the conduit 22. Higher fluid pressure within the conduit 22 enters a chamber 124 at the left end of the valve spool 98 causing it to be shifted fully to the right. With the spool 98 in this position, fluid from the low pressure conduit 24 is circulated to the relief and by-pass valve 112 and heat exchanger 114 through a port 126 and the same branched conduit 110. Also, higher fluid pressure from the conduit 22 is placed in communication with the passage 120 so that excess pressure may be returned to the other conduit across the relief valve 122.

Operation of a poppet valve assembly 127 is dependent upon pressurized fluid received through a conduit 128 from the speed control valve 44. Fluid pressure from the conduit 128 tends to shift a piston 130 rightwardly toward the position illustrated in FIG. 5 so that a ball 132 closes or blocks a passage 134 formed by a tubular insert 136. Thus, fluid pressure from the passage 120 enters an orifice 138 and builds up behind a poppet valve 140 in order to cooperate with a spring 142 in order to secure the poppet valve 140 in its closed position against fluid pressure from the supply conduit 42.

When the fluid pressure is vented from the conduit 128 by the speed control valve 44, the piston 130 shifts leftwardly and permits the ball 132 to become unseated, thus opening communication to a drain passage 144. With fluid pressure thus being relieved behind the poppet 140, it is shifted leftwardly by fluid pressure from the supply conduit 42 to permit fluid relief from the passage 120, thus positively preventing operation of the hydraulic motors 18 and 20.

THE VENTURI MANIFOLD

The venturi manifold 40 is illustrated in greater detail within FIG. 4 and includes an inlet passage 146 for receiving fluid from the pump 32 through the conduit 38. Fluid is directed by the passage 146 through a venturi throat 148 in a venturi assembly 150 and then into a passage 152 through a plurality of radially formed ports 154. The passage 152 is in branched communication with the conduit 72 (also see FIG. 1) and a relief valve 155 which maintains a predetermined pressure within the passage 152 and conduit 72, excess fluid being returned by the relief valve to the conduit 42. Fluid pressure within the conduit 42 is maintained at a level somewhat lower than the pressure level within the conduit 72 by means of the relief and by-pass valve 112 (see FIG. 2).

A high pressure port 156 interconnects the venturi inlet passage 146 with the conduit 48 which is also in communication both with one end of the underspeed actuator 50 and with the speed control and vent valve 44 (see FIG. 1). A low pressure port 158 adjacent the venturi throat 148 is in communication with the conduit 46. As may be seen from FIG. 1, the conduit 46 is also in communication with the opposite end of the underspeed actuator 50 and the speed control and vent valve 44.

Fluid pressure within the high pressure and low pressure ports 156 and 158 is responsive to the rate of fluid flow through the venturi throat 148 and generally proportional to the operating speed of the pump 32 as well as the prime mover (not shown) by which the pump is driven. Accordingly, increasing or decreasing prime mover speed results in a corresponding change in the output of the pump 32. The ports 156 and 158 thereby tend to adjust the pressure differential between the conduits 46 and 48 for a purpose described in greater detail below.

SPEED CONTROL AND VENT VALVE 44

The speed control and vent valve 44, which is better illustrated in FIG. 3, provides manual control over the pressure differential within the conduits 46 and 48. The valve 44 includes a pair of valve spools 160 and 162 which are respectively arranged within parallel bores 164 and 166, the bores being interconnected by a pair of spaced apart passages 168 and 170. The valve spools 160 and 162 are resiliently urged toward the positions illustrated in FIG. 3 by means of respective springs 172 and 174.

The spool 160, in its illustrated position, provides communication between a pair of ports 176 and 178 which are in respective communication with the conduits 46 and 48. Thus, fluid pressure is equalized within the conduits 46 and 48 in order to prevent operation of the hydrostatic transmission. Simultaneously, the spool 160 blocks communication between a port 180, connected with the conduit 42, and the passage 168 while communicating the other interconnecting passage 170 with a drain outlet 182. The restricted flow of fluid from the conduit 42 through a plurality of metering slots 184 is thus returned to the sump through the drain passage 182.

With the spool 162 in its illustrated position, a port 186 connected to the conduit 128 is placed in communication with a drain port 188 in order to vent the conduit 128 back to the sump. Venting of the conduit 128 causes a spring-applied, fluid pressure released parking brake (not shown) to be engaged. Simultaneously, fluid pressure from the conduit 42 is permitted to unseat the poppet valve 140 of both replenishing and relief valves 94 and 96 (also see FIG. 5), thereby interconnecting both pairs of conduits 22, 24 and 26, 28 in order to positively prevent operation of the hydraulic motors 18 and 20 as described above. This function is commonly referred to as "transmission venting."

The valve spool 160 is manually actuated in order to regulate vehicle speed. Manipulation of the spool 160 slightly upwardly in FIG. 3 to a position indicated as "ZERO SPEED" will block communication between the passage 170 and the drain port 182 while maintaining communication between the conduit 42 and the passage 170 across the metering slots 184. Communication between the conduits 46 and 48 is maintained by a plurality of circumferentially spaced metering slots, one of which is indicated at 190. Pressurized fluid from the conduit 42 is communicated by the passage 170 into a chamber 192 at the lower end of the spool 162, forcing it upwardly against the spring 174. The spool 162 will thus be positioned to block communication between the conduit 128 and the drain passage 188 while simultaneously establishing communication between the conduit 128 and the interconnecting passage 168.

Further movement of the valve spool 160 progressively blocks communication between conduit 42 and the interconnecting passage 170 while opening the conduit 42 into communication with the other interconnecting passage 168. Fluid pressure from the conduit 42 is thereby transmitted to the conduit 128 in order to release the spring-applied, pressure released brake described above. Simultaneously, fluid pressre in the conduit 128 again shifts the piston 130 rightwardly in the replenishing and relief valves 94 and 96 (see FIG. 5). Accordingly, the ball 132 blocks the passage 134 and permits pressure to again be developed behind the poppet valve 140. At the same time, an internal passage 194 within the spool 162 transmits fluid pressure into the chamber 192 in order to maintain the spool 162 in its raised position. Upon continued movement of the spool 160, communication between the conduits 46 and 48 is progressively decreased as is fluid pressure in the conduit 46. As the spool 160 approaches the position indicated as "MAXIMUM SPEED," the communication between conduits 46 and 48 is blocked so that the full differential pressure may be developed therein by the venturi manifold 40 in the manner described above.

UNDERSPEED ACTUATOR UNIT

As noted above, the underspeed actuator 50 as generally illustrated within the hydraulic control circuit of FIG. 1 and more specifically ilustrated in FIG. 6, provides an important contribution to the present invention. Generally, the underspeed actuator 50 responds to the fluid pressure differential existing in the conduits 46 and 48. That differential pressure, as indicated above, is generally proportional to operating speed of the pump 32 and the input shafts 14a and 16a for the respective hydrostatic pumps.

Referring now particularly to FIG. 6, the underspeed actuator 50 includes a valve body 202 forming a bore 204 for receiving an elongated tubular piston 206. The valve body 202 is also formed with diametrically opposed, elongated apertures 208 extending along a central portion of the bore 204. The tubular piston 206 is closed at its lower end 210 with counterbores 212 and 214 being formed at the lower and upper ends of the bore 204 respectively. The piston 206 is resiliently urged downwardly by a spring 216. The counterbores 212 and 214 arranged at opposite ends of the bore 204 are in respective fluid communication with the conduits 48 and 46.

An annular split collar 218 encompasses a central portion of the piston 206 and is clamped upon the piston by means of a screw 220. A pair of projections 222 are diametrically formed upon the collar and extend into the elongated openings 208 formed by the valve body 202.

Two rollers 224 and 226 have respective mounting stems 228 and 230 extending into bores 232 formed by the projections 222. Accordingly, the roller 224 is disposed within the guide slot 234 formed by a member 236 which is suitably secured to the valve body 202. Similarly, the other roller 226 is disposed within an elongated groove or slot 238 formed on one side of an element 240 of the lever arrangement 90 (also see FIGS. 1 and 8). The lever element 240 is pivotably connected by means of a pin 242 to an actuating lever 244. The link 88 described above with reference to FIG. 1 is piovtably secured to the opposite side of the lever element 240 at its lower end by means of a pin 246. The lever 244 is secured for rotation with a shaft 248 having a journalled support 250. The shaft 248 may thus be suitably secured to a conventional operator's control (not shown) for adjusting the underspeed actuator.

OPERATION OF THE EMBODIMENT IN FIGS. 1–6

Forward travel of a vehicle including the transmission 12 is initiated by rotating the shaft 248 and lever 244 in counterclockwise fashion (as viewed from the right side of FIG. 6) toward a preselected maximum position while reversed travel may be initiated by similarly rotating the shaft and lever in a clockwise direction. The roller 226 provides a movable pivot point for the lever 240. Thus, the position of the piston 206 within its bore 204 determines the amount of linear motion imparted to the link 88 in response to rotation of the shaft 248 and lever 244. As indicated above, the link 88 is operatively connected to the servo valve 58 through the control linkage described above with specific reference to FIG. 1. In this manner, the link 88 establishes the amount of displacement for both pumps 14 and 16 in order to determine the rate of operation for the motors 18 and 20.

With the piston 206 in the position illustrated in FIG. 6, the roller 226 and pivot pin 246 are in axial alignment so that movement of the link 88 cannot be affected upon rotation of the shaft 248 and lever 244. This position of the piston and condition of the underspeed actuator is commonly referred to as "FULL UNDERSPEED."

In contrast, when the piston 206 is shifted upwardly toward the upper end of its bore 204, the roller 226 also moves upwardly along the groove 238 in the lever 240 in order to change the effective moment arm for the lever. Accordingly, the link 88 experiences increased linear travel with the relative amount of travel of the link 88 reaching a maximum when the piston 206 is shifted completely upwardly within its bore 204. This position provides for relatively maximum displacement of the pumps 14 and 16 as well as maximum operating speed for the transmission and its vehicle, this position commonly being referred to as "ZERO UNDERSPEED." Accordingly, it may be seen that vehicle speed can be controlled by adjusting the position of the piston 206 within the bore 204.

The piston 206 is positioned within its bore in response to the actual pressure differential existing between conduits 46 and 48 as well as force of the spring 216. The pressure differential across the conduits 46 and 48 is regulated either manually by manipulation of the valve spool 160 in the speed control valve (see FIG. 3) or automatically by means of the venturi manifold 40 (see FIG. 4) in response to operating speed of the proportional pump 32 at least when the valve spool 160 is in its MAXIMUM SPEED position.

When the transmission input shafts 14a and 16a are being driven at rated or optimum speed by a prime mover, fluid output of the positive displacement pump 32 is substantially constant. Fluid flow across the venturi throat 148 (see FIG. 4) creates a pressure differential between ports 156 and 158 which is communicated into the respective conduits 48 and 46. With the valve spool 160 (see FIG. 3) in its MAXIMUM SPEED position blocking communication between the conduits 48 and 46, the higher fluid pressure in the conduit 48 and the counterbore 212 of the underspeed actuator 50 is sufficient to overcome the spring 216, thus shifting the piston 206 upwardly toward its ZERO UNDERSPEED position.

However, as the transmission or vehicle encounters an increased load or increased resistance to movement sufficient to cause lugging of the prime mover, operating speed of the positive displacement pump 32 decreases with a resultant decrease of fluid flow through the venturi throat 148. Pressure is thus relatively increased in the outlet port 158 and the conduit 46. Increased pressure is also thereby developed in the upper end of the bore 204 for the underspeed actuator. This increased pressure cooperates with the spring 216 to urge the piston 206 downwardly generally in proportion to the amount of pressure increase within the conduit 46. Accordingly, the displacement of the pumps 14 and 16 is decreased, thereby reducing torque requirements for their input shafts 14a and 16a until the torque requirements of the pumps 14 and 16 equal the torque output of the engine at its instantaneous reduced speed. Should the increased resistance remain constant for a period of time, the position of the piston 206 will remain balanced intermediate the ZERO UNDERSPEED and FULL UNDERSPEED positions.

When the increased load is relieved, the prime mover for the transmission is permitted to regain its rated operating speed with the pump 32 also returning to its normal operating speed. At the same time, normal fluid flow through the venturi throat 148 reestablishes the original pressure differential between the conduits 46 and 48 so that the piston 206 is again shifted upwardly toward the ZERO UNDERSPEED position.

As indicated above, manual control over the piston 206 is accomplished by manipulation of the valve spool 160 in the speed control valve 44 which adjusts or eliminates the pressure differential between the conduits 46 and 48. For example, increased fluid pressure in the conduit 46 cooperates with the spring 216 to shift the piston 206 downwardly in order to decrease operating speed for the transmission and its vehicle. As fluid pressure within the conduits 46 and 48 approaches equilibrium, the spring 216 shifts the piston 206 downwardly to its FULL UNDERSPEED condition where the output displacement of the pumps 14 and 16 is reduced with an equivalent reduction in the operating speed to the transmission.

THE UNDERSPEED ACTUATOR OF FIG. 7

A modified version of the underspeed actuator 50 is illustrated in FIG. 7 and is generally indicated at 50'. The modified underspeed actuator 50' is similar to the underspeed actuator 50 of FIG. 6 except in the following instances. The underspeed actuator 50' includes a second spring 252 arranged beneath the closed end 210' of the spool 206'. The spring 252 functions in combination with the upper spring 216' to stabilize movement of the piston 206' by minimizing its tendency to surge or hunt in response to pressure variations caused by load changes upon the motors 18 and 20.

Both of the springs 216' and 252 may have either a linear or variable gain or spring rate. Preferably, at least one of the springs has such a variable spring rate in order to further improve stability. Such a variable spring rate permits changes in engine speed as determined by the position of the spool 206' within its bore to be more linear relative to load changes upon the motors 18 and 20.

At this point, reference is again made to FIG. 1 which includes another preferred element in association with the underspeed actuator 50 for improving its stability.

Referring now to FIG. 1, it may be seen that a restrictive orifice 254 and a check valve 256 are arranged in parallel along the conduit 48. The check valve is disposed to permit fluid flow from the counterbore 212 in the underspeed actuator 50 toward the venturi manifold 40 and the speed control valve 44. The restriction 254 reduces the rate of fluid flow toward the underspeed actuator 50 in order to limit movement of the piston 206 toward its ZERO UNDERSPEED position. This provides a more gradual increase in transmission speed when the external load on the motors 18 and 20 is reduced in order to permit a prime mover for the transmission to stabilize more rapidly at its rated speed.

THE SPEED OVERRIDE AND VENT VALVE OF FIG. 9

An alternate embodiment of the speed control and vent valve 44 is generally indicated at 44' in FIG. 9. The speed override and vent valve 44' performs generally the same functions as the speed control and vent valve 44 of FIG. 3. However, the construction of the valve 44' in FIG. 9 is substantially simpler.

The speed override and vent valve 44' includes a spool 302 arranged within a bore 304 and urged toward the position illustrated in FIG. 9 by means of a spring 306. With the spool 302 in the position illustrated, communication is established between ports 308 and 310 which are respectively connected to conduits 48' and 46'. Accordingly, fluid pressure in the conduits 46' and 48' is equalized, so that the spring 216 in the underspeed actuator 50' (see FIGS. 6 or 7) may urge the piston 206 downwardly to its FULL UNDERSPEED condition.

Simultaneously, communication is blocked between ports 312 and 314 which are respectively connected to supply conduit 42' and conduit 128', the conduit 128' also being placed in communication with a drain port 316. With the conduit 128 thereby being vented, the loop conduits between each pump and motor combination, as indicated at 22, 24 and 26, 28 in FIGS. 1 and 2, are placed in communication with each other by means of the replenishing and relief valves 94 and 96 (also see FIG. 5). This of course results in application of the spring-applied, pressure released parking brakes as previously described.

Manual actuation of the spool 302 toward its ZERO SPEED position blocks fluid flow through the drain port 316 and interconnects the supply conduit 42' with the conduit 128'. Accordingly, the conduit 128 again supplies fluid under pressure to the replenishing and relief valves in order to release the parking brakes and again permit a pressure differential to be developed within each set of conduits 22, 24 and 26, 28.

Simultaneously, increasing pressure in the conduit 128' is communicated through an internal passage 318 in the spool 302 to a chamber 320. The chamber 320 is formed by a reaction slug 322 slidably disposed in a bore 324 formed in the lower end of the spool 302. Pressure within the chamber 320 acts against the bias of the spring 306 so that the spool 302 is rapidly returned to its MAXIMUM SPEED position when manual restraint of the movement of the spool 302 is removed.

With the spool 302 in its MAXIMUM SPEED position, communication between the conduits 46' and 48' is blocked with the underspeed actuator 50 functioning in its automatic mode for controlling vehicle speed in response to the fluid pressure differential existing between the conduits 46' and 48' as described above.

Manual control over transmission and vehicle speed is normally maintained by precise positioning of the lever 244 in the lever arrangement 90 (see FIGS. 6 and 8). Such manual control could also be maintained, for example, by means of a simple and conventional speed control valve (not shown). In either case, the speed override and vent valve 44' permits an operator to manually adjust the spool 302 between MAXIMUM and ZERO SPEED positions with fluid under pressure being relieved from the high pressure conduit 48' into the other conduit 46' in order to adjust the pressure differential existing in those conduits. Upon a malfunction within the control circuit, such as the absence of fluid pressure in the supply conduit 42' when the engine is shut down, the spring 306 returns the spool 302 to its illustrated position and applies the parking brakes described above as well as terminating operation of the transmission 12 (see FIGS. 1 and 2).

I claim:

1. A control system for regulating displacement of a pump unit in a hydrostatic transmission including input means and output means, the control system having a positive displacement pump means driven in conjunction with the transmission input means to produce output fluid flow proportional to the operating speed of the transmission input means, and comprising lever means coupled with the pump unit for selectively adjusting its displacement, a hydraulically responsive underspeed actuator operatively coupled with the lever means in order to adjust its effective moment arm and thereby vary the amount of actual change in pump displacement relative to movement of the lever means, and signal means for receiving output fluid flow from the positive displacement pump means and communicating a variable fluid signal to which the underspeed actuator is responsive.

2. The control system of claim 1 wherein the underspeed actuator comprises a valve body and a piston movably arranged in a bore formed by the valve body for response to the variable fluid signal including means forming a movable pivot point for the lever means.

3. The control system of claim 2 further comprising resilient means having a variable spring rate for resisting movement of the piston and stabilizing its response to the variable fluid signal.

4. The control system of claim 3 wherein the signal means comprises a venturi unit for producing a variable differential pressure in a pair of conduits, the conduits being in communication with the valve body bore on opposite sides of the piston.

5. The control system of claim 2 wherein the signal means comprises a venturi unit for producing a variable differential pressure in a pair of conduits, the conduits being in communication with the valve body bore on opposite sides of the piston.

6. The control system of claim 4 further comprising a speed control valve in effective communication with the underspeed actuator, the speed control valve including a manual override control element for selectively adjusting the variable fluid signal and the response of the underspeed actuator.

7. The control system of claim 1 further comprising a speed control valve in effective communication with the underspeed actuator, the speed control valve including a manual override control element for selectively adjusting the variable fluid signal and the response of the underspeed actuator.

8. A control system for regulating displacement of a pump unit in a hydrostatic transmission also including input means and output means, comprising proportional signal means being operable with the transmission input means to produce an output signal proportional to the operating speed of the transmission input means, lever means coupled with the pump unit for adjusting its displacement, an underspeed actuator operatively coupled with the lever means in order to adjust its effective moment arm and thereby vary the amount of actual change in pump displacement relative to movement of the lever means, and signal transmitting means for receiving the proportional output signal from the proportional signal means and communicating a variable signal to which the underspeed actuator is responsive.

9. The control system of claim 8 wherein the underspeed actuator comprises a piston means movable in response to the variable signal from the signal transmitting means, the movable piston including means forming a movable pivot point for the lever means.

10. The control system of claim 9 further comprising resilient means for resisting movement of the piston.

11. The control system of claim 10 wherein the resilient means has a variable spring rate for stabilizing movement of the piston in response to the variable signal.

12. The control system of claim 11 further comprising a speed control means including a manual override control element for selectively adjusting response of the underspeed actuator to the variable signal.

13. The control system of claim 8 further comprising a speed control means including a manual override control element for selectively adjusting response of the underspeed actuator to the variable signal.

14. A control system for a transmission including input means, output means and means for adjusting torque transmitting capacity of the transmission, comprising proportional signal means being operable with the transmission input means to produce an output signal proportional to the operating speed of the transmission input means, lever means coupled with the means for adjusting torque transmitting capacity, an underspeed actuator operatively coupled with the lever means in order to adjust its effective moment arm and thereby vary the amount of actual change in torque transmitting capacity relative to movement of the lever means, and signal transmitting means for receiving the proportional output signal from the proportional signal means and communicating a variable signal to which the underspeed actuator is responsive.

15. The control system of claim 14 wherein the underspeed actuator comprises a piston movable in response to the variable signal from the signal transmitting means, the movable piston including means forming a movable pivot point for the lever means.

16. The control system of claim 15 further comprising resilient means for resisting movement of the piston.

17. The control system of claim 16 wherein the resilient means has a variable spring rate for stabilizing movement of the piston in response to the variable signal.

18. The control system of claim 17 further comprising a speed control means including a manual override control element for selectively adjusting response of the underspeed actuator to the variable signal.

19. The control system of claim 14 further comprising a speed control means including a manual override control element for selectively adjusting response of the underspeed actuator to the variable signal.

20. A combined hydrostatic transmission and control system, the hydrostatic transmission including a pump unit driven by a transmission input means and a motor unit coupled with the pump unit by a closed hydrostatic loop and coupled with a transmission output means, the pump unit including a movable control means for adjusting its displacement, the control system comprising
   a positive displacement pump means driven with the transmission input means to produce output fluid flow proportional to operating speed of the transmission input means,
   a venturi unit for receiving output fluid flow from the positive displacement pump means and developing a differential pressure in a pair of conduits,
   a speed control valve also being in communication with the two conduits and including a manual override control element for selectively intercommunicating the two conduits,
   a lever mechanism coupled with the movable control means for the pump unit, the lever mechanism being movable for selectively adjusting displacement of the pump unit, and
   a hydraulically responsive underspeed actuator including a valve body forming a bore, a piston means being slidably disposed within the bore and providing a movable pivot point for the lever means, the two conduits being in communication with the bore on opposite ends of the piston in order to position the piston and adjust the pivot point for the lever mechanism relative to operating speed of the positive displacement pump and transmission input means.

21. The combined hydrostatic transmission and control system of claim 20 further comprising resilient means for resisting movement of the piston within its bore.

22. The combined hydrostatic transmission and control system of claim 21 wherein the resilient means has a variable spring rate for stabilizing movement of the piston in response to variation in the differential pressure for the two conduits.

* * * * *